(12) United States Patent
Cho et al.

(10) Patent No.: US 7,979,022 B2
(45) Date of Patent: Jul. 12, 2011

(54) METHOD AND SYSTEM FOR GENERATING SWITCHING TIMING SIGNAL FOR SEPARATING TRANSMITTING AND RECEIVING SIGNAL IN RF REPEATER OF MOBILE TELECOMMUNICATION NETWORK USING TDD AND OFDM MODULATION

(75) Inventors: Woungsik Cho, Seoul (KR); Sangwon Yun, Seoul (KR)

(73) Assignee: SK Telecom Co., Ltd. (KR)

( * ) Notice: Subject to any disclaimer, the term of this patent is extended or adjusted under 35 U.S.C. 154(b) by 606 days.

(21) Appl. No.: 11/572,078

(22) PCT Filed: Jul. 14, 2005

(86) PCT No.: PCT/KR2005/002260
§ 371 (c)(1),
(2), (4) Date: Jan. 12, 2007

(87) PCT Pub. No.: WO2006/006828
PCT Pub. Date: Jan. 19, 2006

(65) Prior Publication Data
US 2007/0201402 A1    Aug. 30, 2007

(30) Foreign Application Priority Data
Jul. 14, 2004   (KR) .................. 10-2004-0054928

(51) Int. Cl.
*H04B 7/14* (2006.01)
(52) U.S. Cl. .................. 455/11.1; 370/503; 375/362
(58) Field of Classification Search .................. 370/503, 370/516, 518, 519; 375/362, 373, 376; 455/7, 455/11.1
See application file for complete search history.

(56) References Cited

U.S. PATENT DOCUMENTS

| | | | | |
|---|---|---|---|---|
| 5,471,187 A * | 11/1995 | Hansen et al. | ............. | 340/146.2 |
| 6,115,369 A * | 9/2000 | Oura | ............................. | 370/337 |
| 6,512,427 B2 * | 1/2003 | Nakano | ........................ | 333/132 |
| 6,570,858 B1 * | 5/2003 | Emmons et al. | ............. | 370/321 |
| 6,940,827 B2 * | 9/2005 | Li et al. | ......................... | 370/278 |
| 6,993,084 B1 * | 1/2006 | Eberlein et al. | ............... | 375/260 |
| 7,233,771 B2 * | 6/2007 | Proctor et al. | ............... | 455/11.1 |
| 7,457,378 B1 * | 11/2008 | Sher et al. | ..................... | 375/345 |
| 2001/0017896 A1 * | 8/2001 | Murakami et al. | ............ | 375/260 |
| 2003/0189917 A1 * | 10/2003 | Sudo | ............................. | 370/347 |
| 2004/0081205 A1 * | 4/2004 | Coulson | ........................ | 370/503 |

* cited by examiner

*Primary Examiner* — Huy D Vu
*Assistant Examiner* — Benjamin Lamont
(74) *Attorney, Agent, or Firm* — Baker Hostetler LLP (57) ABSTRACT

Disclosed are a method and system for generating switching a timing signal for separating a transmitting and receiving signal in a RF repeater of a mobile telecommunication network by using a TDD scheme and an OFDM modulation scheme, which transmits a part of a RF signal extracted from a coupler of a RF repeater to a switching timing signal generating circuit when a RF signal transmitted from an Access Point (hereinafter, referred to as "AP") is transmitted to a RF repeater, locates a frame start position of a RF signal by correlating a reference signal generated in a switching timing signal generating circuit and a RF signal extracted from a coupler, and is capable of transmitting a RF signal by distinguishing between a downlink signal and a uplink signal by using a switching timing signal in a switch when calculating a starting point of a downlink signal and a uplink signal which is included in an RF signal by using an AP's frame standard on the basis of a frame starting location, and transmitting to a RF repeater's switch generating a switching timing signal by using it.

26 Claims, 7 Drawing Sheets

METHOD AND SYSTEM FOR GENERATING SWITCHING TIMING SIGNAL FOR SEPARATING TRANSMITTING AND RECEIVING SIGNAL IN RF REPEATER OF MOBILE TELECOMMUNICATION NETWORK USING TDD AND OFDM MODULATION

FIELD OF THE INVENTION

The present invention relates to a method and system for generating a switching timing signal for separating a transmitting and receiving signal in a RF repeater of a mobile telecommunication network by using a Time Division Duplex (hereinafter, referred to as "TDD") scheme and an Orthogonal Frequency Division Multiplexing (hereinafter, referred to as "OFDM") modulation scheme. More particularly, the present invention relates to a method and system for generating switching a timing signal for separating a transmitting and receiving signal in a RF repeater of a mobile telecommunication network by using a TDD scheme and an OFDM modulation scheme, which transmits a part of a RF signal extracted from a coupler of a RF repeater to a switching timing signal generating circuit when a RF signal transmitted from an Access Point (hereinafter, referred to as "AP") is transmitted to a RF repeater, locates a frame start position of a RF signal by correlating a reference signal generated in a switching timing signal generating circuit and a RE signal extracted from a coupler, and is capable of transmitting a RF signal by distinguishing between a downlink signal and a uplink signal by using a switching timing signal in a switch when calculating a starting point of a downlink signal and a uplink signal which is included in an RF signal by using an AP's frame standard on the basis of a frame starting location, and transmitting to a RF repeater's switch generating a switching timing signal by using it.

BACKGROUND OF THE INVENTION

Wireless network are provided as computer, electronic and communication technology develops by leaps and bounds. A most basic wireless communication service, which is a wireless voice communication service providing voice communication for subscribers of mobile communication terminal by wireless scheme, has a characteristic to provide service regardless of time and place. Further, besides supplementing a voice communication service by providing a message service, a wireless internet service is brought up recently which provides an internet communication service for subscribes of mobile communication terminal through a wireless communication network.

Herein, services which are provided by Code Division Multiple Access (hereinafter, referred to "CDMA") mobile communication system have been developed not only to a voice service but also to multimedia communication services which transmit and receive data such as circuit data, packet data and etc.

Further, recently, an International Mobile Telecommunication 2000 (hereinafter, referred to as IMT-2000), which is the 3G mobile communication system, has been commercialized by the development of information and communication. The IMT-2000 is the service which is a CDMA 2000 1x, 3x, EV-DO, WCDMA (Wideband CDMA) and etc., and can provide a wireless internet at transmission rate, more than 144 Kbps much faster than 14.4 Kbps or 56 Kbps, data transmission rate supported in IS-95A and IS-95B network, by using IS-95C network developed from an existing IS-95A and IS-95B network. In Particular, if using IMT-2000 service, it is possible to provide various multimedia services (for example AOD, VOD and etc.) at much faster rate as well as the improvement of existing voice and WAP services quality.

However, due to high cost for constructing a base station, the charge for using is high in an existing mobile communication system. Further, due to a small screen size of a mobile communication terminal, there is a limit to provide very high speed wireless internet services for example a limit to use contents. Furthermore, there is a limit to provide public services owing to the problem of radio wave interference and narrow using coverage in Wireless Local Area Network (hereinafter, referred to as WLAN). Therefore, in order to guarantee portability and mobility, and provide very high speed wireless Internet services at a lower charge, mobile internet technology is emerged which uses a TDD scheme for a duplex scheme and uses a OFDM scheme for a modulation scheme.

Herein, the TDD scheme is a two-way transmission scheme which allocates uplink and downlink in turns timely at the same frequency band. The TDD scheme has higher efficiency than a Frequency Division Duplex (hereinafter, referred to as FDD) scheme allocating two different frequency to uplink and downlink, and has a characteristic to be suitable for transmitting asymmetric or bursting applications.

Herein, an OFDM scheme is a next generation communication scheme adopted as a standard of a wireless LAN (802.11g,a), a W-MAN (802.16), a digital broadcasting, a VDSL and etc., and is a digital modulation scheme for improving transmission speed per band width and preventing multipath interference. The biggest characteristic of the OFDM scheme is to have a quadrature between sub-carriers. That is, it is possible to have an excellent characteristic in multipath fading and to improve transmission content largely by adjusting data transmission rate corresponding to each sub-carrier in the ration of signal to noise in a particular sub-carrier. Furthermore, the OFDM scheme has a strong characteristic in narrow-band interference because it has influence only on some sub-carriers.

However, the OFDM scheme has a characteristic to be sensitive to frequency offset of a carrier and phase noise, which becomes a main cause to affect the security of quadrature, that is, to deteriorate the capacity of a system, to have relatively a high ratio of average power to the maximum power comparative to one of a single carrier modulation, and to decrease power efficiency of an RF power amplifier. It is possible to overcome the interference between symbols due to multipath channel while it is impossible to reconstruct the signal transmitted to the sub-channel when the attenuation of a particular sub-channel is serious. In order to prevent this, it is possible to solve the problem using error correction code which is called a Coded OFDM (hereinafter, referred to as "COFDM"). Herein, it is possible to use both block code such as Reed-Solomon code and convolutional code as the error correction codes and to take an advantage of a connection code coupling the two codes, turbo codes and etc., too.

There is a High-speed Portable internet (hereinafter, referred to as "HPi") system as representative portable internet technology. The HPi system is the next generation wireless internet technology which the Telecommunications Technology Association (hereinafter, referred to as "TTA") is developing in association with Samsung Electronics Co., Ltd. and the Electronics and Telecommunications Research Institute (hereinafter, referred to as "ETRI").

The HPi system uses the frequency band of 2.3 GHz and, as described above, uses the TDD as a duplex scheme and the OFDM as a modulation scheme. Furthermore, the HPi system provides the mobility of 60 Km/h and is a wireless data system which has uplink and downlink asymmetric transmission characteristic considering a downlink transmission speed is 24.8 Mbps but a uplink transmission speed is 5.2 Mbps.

Figure 1:
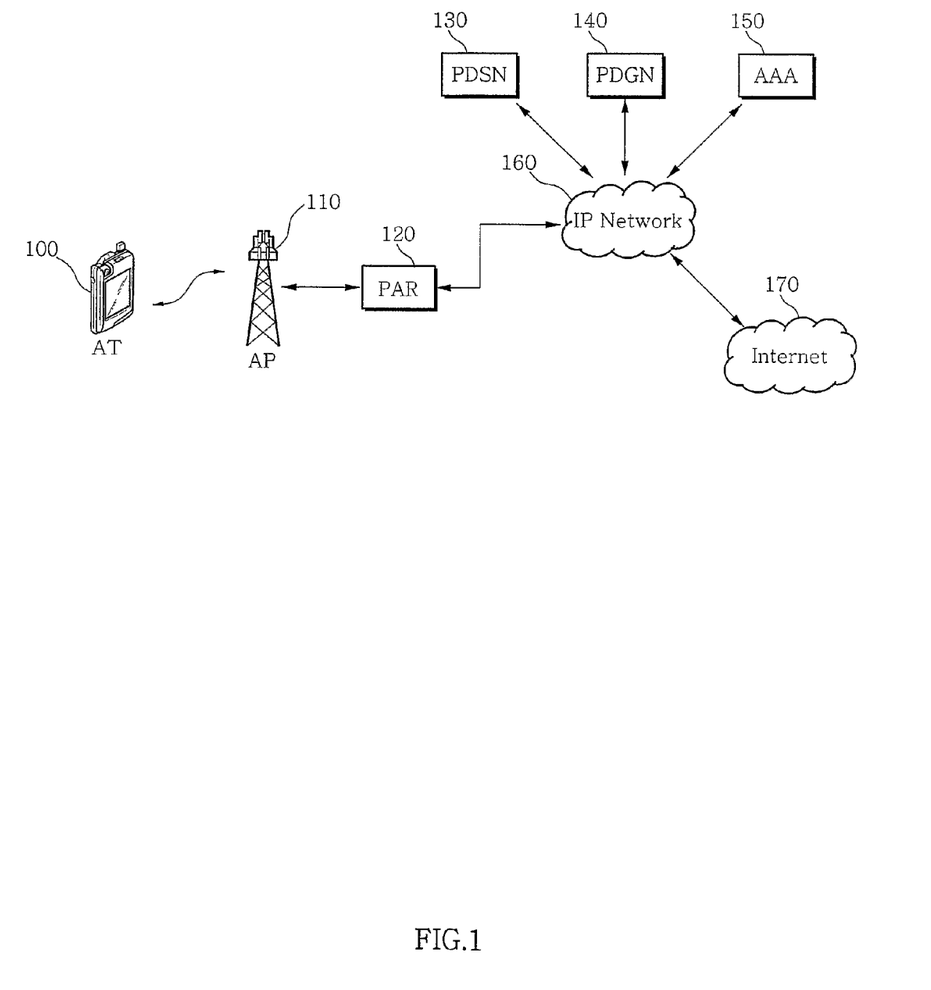
FIG. 1 is a diagram schematically showing a an HPi system.

FIG. 1 is a diagram schematically showing an HPi system.

As shown in FIG. 1, the HPi system may include an Access Terminal 100 (hereinafter, referred to as "AT"), an Access Point 110 (hereinafter, referred to as "AP"), a Packet Access Router 120 (hereinafter, referred to as "PAR"), a Packet Data Serving Node 130 (hereinafter, referred to as "PDSN"), a Packet Data Gateway Node 140 (hereinafter, referred to as "PDGN"), an Authentication Authorization Accounting 150 (hereinafter, referred to as "AAA"), an IP network 160 and an internet 170.

Herein, the AT 100 refers to a mobile communication terminal which uses a very high speed wireless internet service by connecting with the HPi system and has low power Radio Frequency (hereinafter, referred to as "RF")/Intermediate Frequency (hereinafter, referred to as "IF") module and controller function, a Media Access Control (hereinafter, referred to as "MAC") frame variable control function depending on service characteristics and radio wave circumstance, a handover function, authentication and encryption functions and etc.

The AP 110 transmits the data received from PAR 120 as a base station of the HPi system, and has a low-power RF/IF module and controller function, OFDMA/TDD packet scheduling and channel multiplex function, an MAC frame variable control function depending on service characteristics and radio wave circumstances, a 50 Mbps high speed traffic real-time control function, a handover function, and etc.

Further, the AT 100 and the AP 110 have a 50 Mbps packet transmission modulating demodulating function for data transmission, a high packet channel coding function, a real-time modem control function, and etc.

The PAR 120 is a packet access router which accommodates a number of the AP 110, has a handover control function of AP 100, a handover control function of the PAR 120, a packet routing function, an internet connection function and etc., and further connects with IP network.

The PDSN 130 relay transmitting and receiving of packet data between an external packet data service server such as the internet 170, etc. and a base station through the IP network 160 and administers the location information data of a mobile communication terminal including the AT 100.

The PDGN 140 performs a routing which traces and then connects with an external packet data service server of the internet 170, etc. Further, the AAA 150 links the PDSN 130, carries out accounting for a packet data used by the AT 100 and authenticates the connection with the AP 100.

The IP network 160 connects with the PDSN 130, PDGN 140 and the AAA 150, and then transmits a packet data received from an external packet data service server such as the Internet 170, etc. to the AP 100.

Meanwhile, in a mobile communication system, a mobile communication service region has been generally divided into a plurality of cells using a frequency reuse concept in order to extend the coverage of a mobile communication network and a Base Station (hereinafter, referred to as "BS") have been installed around the center of each of the cells in order to handle the mobile communication service. Herein, the ratio of a cell is set depending on the strength of a signal or the amount of data traffic. That is, the ratio of a cell is set small in an urban center in which there is a lame amount of data traffic and the ratio of a cell is set large in a suburb in which there is comparatively less amount of data traffic so that the amount of traffic should not exceed the treatment content of the wireless BS handling a corresponding mobile communication service.

There have been shade regions of radio waves such as a basement, a building's interior, a tunnel, etc. which it is difficult for the radio wave to reach in spite of these effort to support better mobile communication services controlling the ratio of a cell depending on the frequency reuse concept or the amount of traffic, etc. It may cause undesirable results in cell-construction as well as in weakening the economical efficiency due to equipping expenses, installing expenses and maintenance and repair expenses, etc. to equip a plurality of new base stations for solving the shade of radio wave in the shade regions of radio wave.

In order to solve the above-mentioned problem, it is possible to provide mobile communication services using a repeater in these shade regions of radio waves. The repeater transmits a signal amplified to reach shade regions of radio waves to these shade regions of radio waves and transmits a terminal signal amplified and filtered to reach a base station to the base station in order to solve the problem of the shade of radio wave.

Meanwhile, in order to transmit and receive a wireless signal between a base station and a terminal, the repeater might be capable of distinguishing an uplink signal from a downlink signal. The repeater of a mobile communication system must distinguish an uplink signal from a downlink signal by using a duplex when using the FDD scheme. However, it is impossible to distinguish an uplink signal from a downlink signal by using a duplex because it uses the same frequency in order to distinguish an uplink signal from a downlink signal when using the TDD scheme like the HPi system, etc. Accordingly, the repeater using the TDD scheme is able to distinguish an uplink signal from a downlink signal by using a switch and provide a path for each signal selectively. In order to do this, it is necessary for the controlling signal to distinguish between the starting point of a downlink signal and the one of an uplink signal exactly and to change a shifting path by controlling the path of a switch depending on each of signals.

However, the RF repeater can not control a switch depending on each of signals because it is not capable of receiving a transmitting timing data to distinguish between a downlink signal and an uplink signal from a wireless type of a base station. That is, it is impossible to use the RF repeater in a mobile communication system of the TDD scheme. Therefore, the plan is demanded which can distinguish between a downlink signal and an uplink signal in the RF repeater itself and generate a switching timing signal to provide a path of each signal selectively in order to use the RF repeater even in the mobile communication system of the TDD scheme.

SUMMARY OF THE INVENTION

Therefore, the present invention has been made in view of the above-mentioned problems, and it is as object of the present invention to provide a method and system for generating a switching timing signal for separating a transmitting and receiving signal in a RF repeater of a mobile telecommunication network by using a Time Division Duplex (hereinafter, referred to as "TDD") scheme and an Orthogonal Frequency Division Multiplexing (hereinafter, referred to as "OFDM") modulation scheme. More particularly, the present invention relates to a method and system for generating switching a timing signal for separating a transmitting and receiving signal in a RF repeater of a mobile telecommunication network by using a TDD scheme and an OFDM modulation scheme, which transmits a part of a RF signal extracted from a coupler of a RF repeater to a switching timing signal generating circuit when a RF signal transmitted from an Access Point (hereinafter, referred to as "AP") is transmitted to a RF repeater, locates a frame start position of a RF signal by correlating a reference signal generated in a switching timing signal generating circuit and a RF signal extracted from a coupler, and is capable of transmitting a RF signal by distinguishing between a downlink signal and a uplink signal by using a switching timing signal in a switch when calculating a starting point of a downlink signal and a uplink signal which is included in an RF signal by using an AP's frame standard on the basis of a frame starting location, and transmitting to a RF repeater's switch generating a switching timing signal by using it.

According to one aspect of the present invention, there is provided a method for generating a switching timing signal to separate a transmission signal in an RF repeater of a mobile communication system including an AP (Access Point), an AT (Access Terminal) and an RF repeater operating based on a TDD scheme and an OFDM modulation scheme, the method comprising the steps of: (a) receiving an RF signal from the AP, extracting a part of the RF signal in a coupler of the RF repeater, and transmitting the part of the RF signal to a switching timing signal generating circuit; (b) correlating the RF signal extracted from the coupler with the reference signal generated in the switching timing signal generating circuit; (c) determining a frame start position of the RF signal by analyzing a correlation result value; (d) calculating starting points of a downlink signal and an uplink signal included in the RF signal on the basis of the frame start position; (e) generating the switching timing signal by using starting point information of the downlink signal and the uplink signal, and transmitting the switching timing signal to switches of the RF repeater; and (f) separately transmitting the downlink signal from the uplink signal by controlling the switches by using the switching timing signal.

According to another aspect of the present invention, there is provided A RF repeater for separating RF signals transmitted between an AP (Access Point) and an AT (Access Terminal) into a downlink signal and an uplink signal for use in a mobile communication network employing a TDD scheme and an OFDM modulation scheme, the RF repeater comprising: a Band Pass Filter (hereinafter, referred to as "BPF") for passing signal components of a frequency band used in transmission of the RF signals transmitted between the AP and the AT, while blocking signal components of unused frequency bands; a Low Noise Amplifier (hereinafter, referred to as "LNA") for reducing noise components of the RF signals, while amplifying signal components; an attenuator for adjusting a signal level of an amplified signal; a High Power Amplifier (hereinafter, referred to as "HPA") for amplifying a controlled signal received from the attenuator up to an effective power level feasible for transmitting via air; a switch for separating the RF signals into the downlink signal and the uplink signal by using a switching timing signal; and a switching timing signal generating circuit for extracting a part of the RF signal, correlating extracted RF signals with a reference signal, determining a frame start position of the extracted RF signals by analyzing a correlation result value, calculating a starting point of the downlink signal and the uplink signal on the basis of the frame start position, and generating the switching timing signal by using a starting point information of the downlink signal and the uplink signal, and transmitting the switching timing signal to the switch.

According to further another aspect of the present invention, there is provided a switching timing signal generating circuit for generating a switching timing signal separating RF signals received from an AP and an AT in a RF repeater into a downlink signal and an uplink signal for use in a mobile communication network employing a TDD scheme and an OFDM modulation scheme, the switching timing generating circuit comprising: a divider for receiving extracted RF signals extracted as a part of the RF signals from a coupler included in the RF repeater; a level director for measuring a level of the extracted RF signal received from the divider; a Variable Gain Amplifier (hereinafter, referred to "VGA") for receiving a level value measured at the level detector, and generating the level of the extracted RF signal; a log-scale amplifier for converting a variation of the extracted RF signals from a linear scale to a decibel (dB) scale; a pulse generator for generating a pulse waveform signal by using the extracted RF signals received from the log-scale amplifier; a reference pulse generator for generating a reference pulse waveform signal for use in determining a frame start position of the extracted RF signals; a comparator for correlating the pulse waveform signal received from the pulse generator with the reference pulse waveform signal received from the reference pulse generator; a timing controller for determining a frame start position of the extracted RF signals by analyzing a correlation result value, calculating a starting point of the downlink signal and the uplink signal on the basis of the frame start position, and generating a switching timing signal by using the starting point information of the downlink signal and the uplink signal, and transmitting the switching timing signal to a switch of the RF repeater; and a phase tuning circuit for receiving a phase information of the pulse waveform signal generated in the pulse generator, and tuning the phase of the reference pulse waveform signal.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference will now be made in detail to the preferred embodiments of the present invention. The same reference numerals are used to designate the same components as those shown in other drawings. In the following description of the present invention, a detailed description of known configurations and functions incorporated herein will be omitted when it may make the subject matter of the present invention rather unclear.

Figure 2:
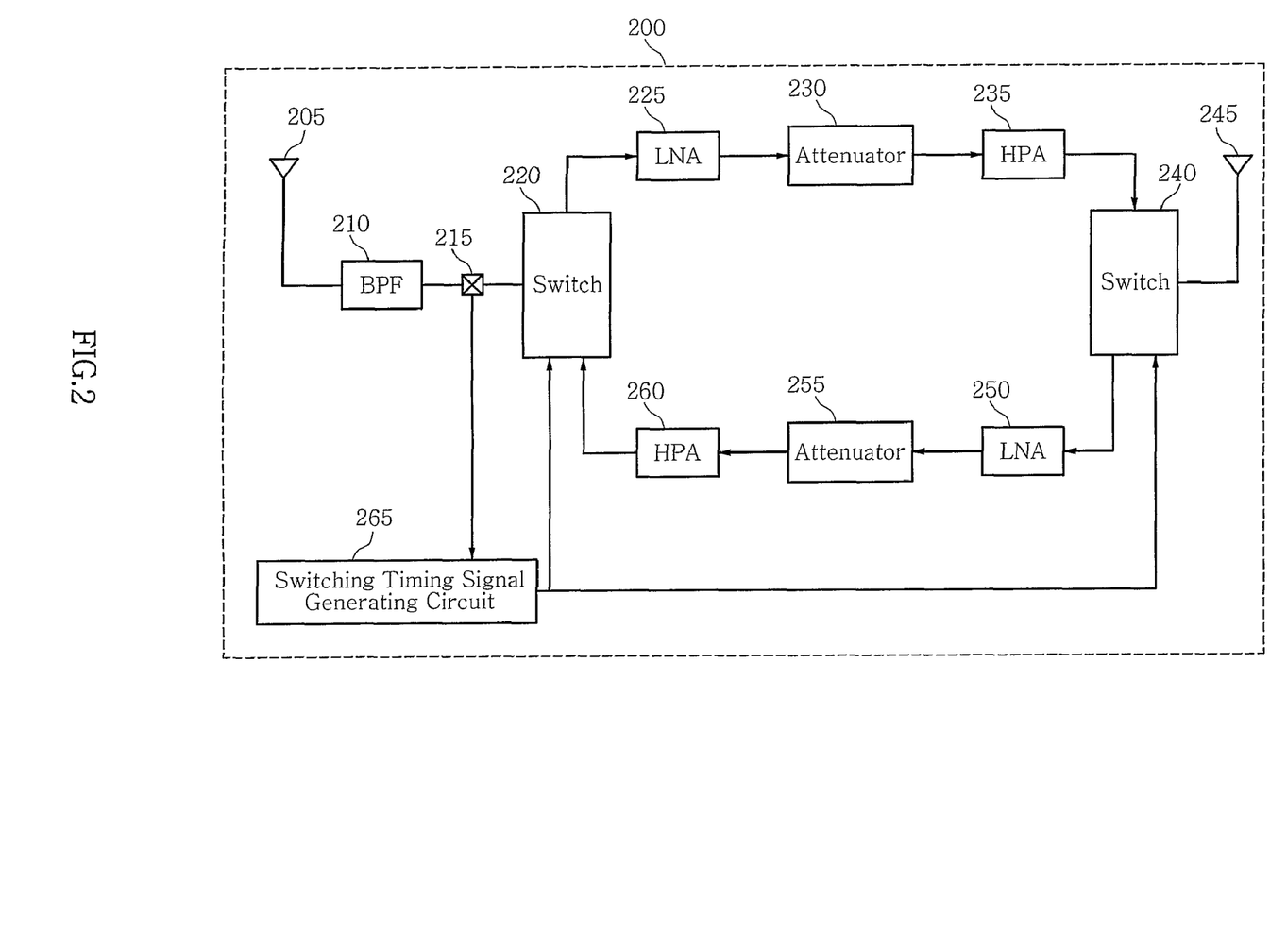
FIG. 2 is a diagram schematically showing the construction of a RF repeater according to a preferred embodiment of the present invention.

FIG. 2 is a diagram schematically showing the construction of a RF repeater according to a preferred embodiment of the present invention.

The RF repeater 200 of the present invention makes both link communication possible by time-dividing the same frequency and distinguishing a downlink signal from an uplink signal due to using a TDD scheme, so that the RF repeater is allowed to transmit a RF signal by using the same frequency between an AT 100 and an AP 110.

As shown in FIG. 2, the RF repeater 200 according to a preferred embodiment of the present invention may include a donor antenna 205, a Band Pass Filter 210 (hereinafter, referred to as "BPF"), a coupler 215, switches 220 and 240, Low Noise Amplifier 225, 250 (hereinafter, referred to as "LNA"), attenuators 230 and 255, High Power Amplifiers 235 and 260 (hereinafter, referred to as "HPA"), a remote antenna 245, a switching timing signal generating circuit 265, and etc. as internal members.

The transmitting process of a signal at a forward and backward channel by using members of the RF repeater 200 described above may be described specifically as follows;

At a forward channel, a RF signal, which has been received from an AP 110, is transmitted to a BPF 210 through a donor antenna 205. The BPF 210 allows the only signal of a frequency band used for transmitting a signal between an AP 110 and an AT 100 to pass through, blocks the signal component of another frequency band, and then transmits to a switch 220. Herein, because 2.3 GHz frequency band is used when a mobile communication network of the present invention is an HPi system, it is allowed to pass through the only signal of a frequency band and to block the signal component of another frequency band in the BPF 210.

The switch 220 transmits a RF signal received to a LNA 225. Further, the LNA 225 reduces the noise component of the RF signal, amplifies the signal component, and transmits to an attenuator 230. Furthermore, the attenuator 230 adjusts the signal level and transmits to an HPA 235. Herein, the HPA 235 amplifies up to an effective power to transmit the RF signal to a switch 240 via air. The switch 240 radiates the RF signal to the AT 100 through a remote antenna 245.

At a backward channel, a switch 240 transmits the RF signal to a LNA 250 when receiving a RF signal from the AT 100 through the remote antenna. Further, the LNA 250 reduces the noise component of the RF signal, amplifies the signal component, and transmits it to an attenuator 255. Furthermore, the attenuator 255 adjusts a signal level and transmits to an HPA 260. Herein, the HPA 260 amplifies up to an effective power to transmit the RF signal to the switch 220 via air.

The switch 240 transmits a RF signal transmitted to the BPF 210. Further, the BPF 210 allows the only signal of a transmitting frequency band to pass through, blocks signals of another frequency band, and radiates the RF signal through a donor antenna 205.

Meanwhile, a coupler is 215 located in between the BPF 210 and the switch 220, extracts a part of the RF signal transmitted from the BPF 210 to the switch 220, and transmits it to a switching timing signal generating circuit 265. Herein, the switching timing signal generating circuit 265 analyzes an extracted RF signal, generating a switching timing signal for transmitting the RF signal, and transmits to the switch 220.

A switching timing signal distinguishes between the downlink signal and the uplink signal included in RF signals, and then when the downlink signal is received, the switches 220 and 240 are controlled so that the downlink signal is radiated through a remote antenna 245 via a LNA of the RF repeater 225, an attenuator 230, and a HPA 235, and when the uplink signal is received, the switches 220 and 240 are controlled so that the uplink signal is radiated through a donor antenna 245 via a LNA of the RF repeater 225, an attenuator 230, and a HPA 235.

Meanwhile, the switching timing signal generating circuit 265 may be an internal member of the RF repeater 200 as described above, and can generate a switching timing signal as an independent apparatus from the RF repeater 200, and then connect with the RF repeater 200 to provide the switches 220 and 240 generating.

Figure 3:
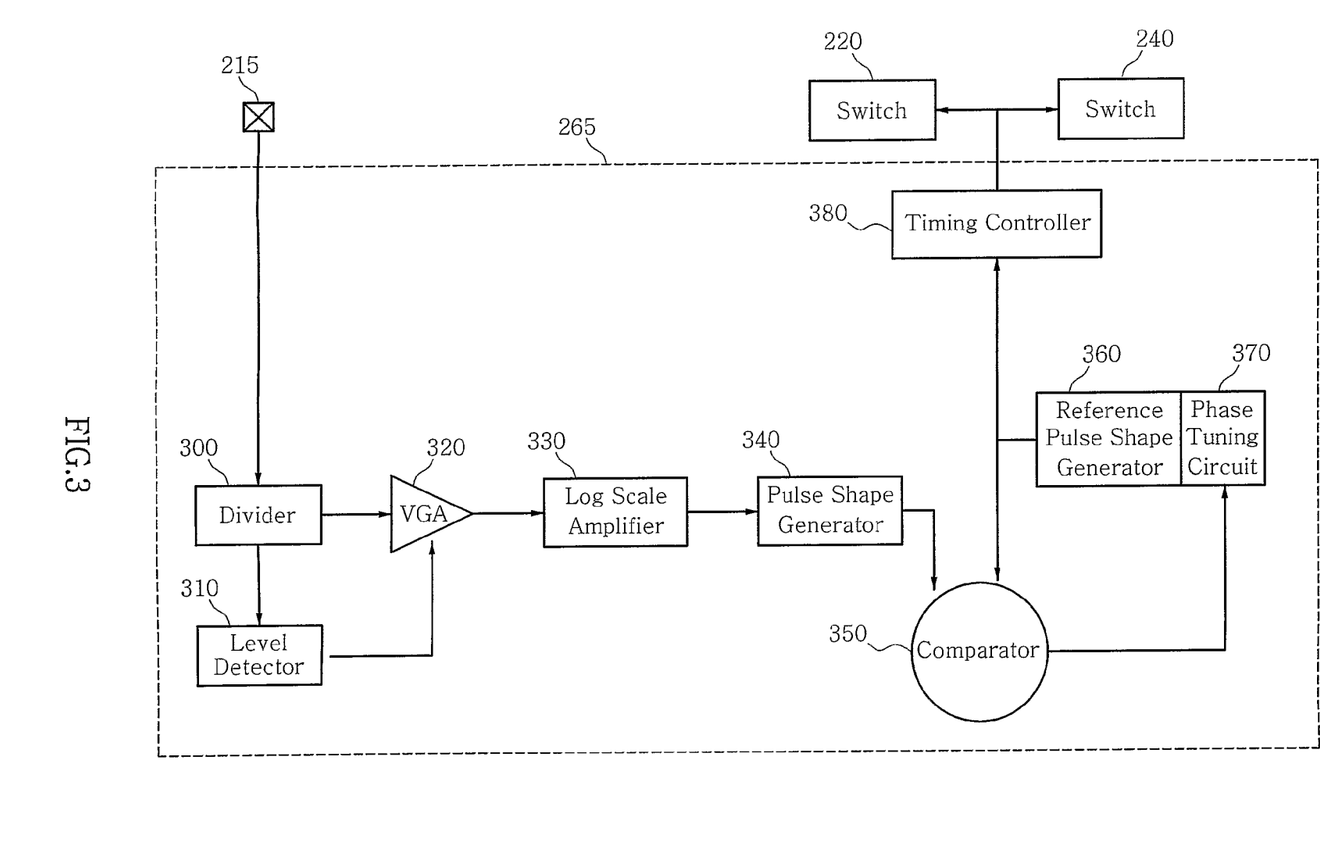
FIG. 3 is a diagram showing the construction of a switching timing signal generating circuit according to a preferred embodiment of the present invention.

FIG. 3 is a diagram showing the construction of a switching timing signal generating circuit according to a preferred embodiment of the present invention.

As shown in FIG. 3, the switching timing signal generating circuit 265 according to a preferred embodiment of the present invention may include a divider 300, a level director 310, a VGA 320, a log-scale amplifier 330, a pulse generator 340, a comparator 350, a reference pulse generator 360, a phase tuning circuit 370, a timing controller 380, and etc. as internal members.

The process of generating a switching timing signal by using members of the switching timing signal generating circuit 265 described above may be described specifically as follows;

The coupler 215 of the RF repeater 200 extracts a part of RF signals, and transmits it to the divider 300. Further, the divider 300 separates the transmission RF signals into the level detector 310 and a VGA 320. Furthermore, the level detector 310 measures a level of the signal and transmits it to the VGA 320. Then, the VGA 320 is received a level value measured in the level detector 310, and always maintains the output signal of the VGA 320 at a steady level. The log-scale amplifier 330 lets a variation volume of a signal received from the VGA 320 changed from a linear scale into a decibel (dB) scale, and then transmits it to a pulse generator 340. Herein, the pulse generator 340 generates a pulse waveform signal, and transmits it to the comparator 350 by using the signal received.

The reference pulse generator 360 generates a reference pulse waveform signal to determine a frame start position of the RF signal after correlating the pulse waveform signal generated in the pulse generator, and transmits it to the comparator 350. The comparator 350 compares a correlation degree of a signal received from the pulse generator with one of a signal received from the reference pulse generator. That is, the comparator 350 correlates the two signals, and transmits the result value to the timing controller 380.

The timing controller 380 determines a frame start position of the extracted signal by analyzing the received result value, and calculates a starting point of a downlink signal and an uplink signal on the basis of the detected frame start position. Herein, the timing controller 380 has the information of a RF signal's frame structure described below, and calculates a starting point of a downlink signal and an uplink signal included in a RF signal by using the information of a frame structure when detecting a frame position of a RF signal.

The timing controller 380 generates a switching timing signal by using the starting point information of a downlink signal and an uplink signal calculated, and transmits it to the switches 220 and 240. The phase tuning circuit 370 receives the phase information of a pulse waveform generated in the pulse generator 340, and tunes the phase of the reference pulse waveform When generating a switching timing signal and transmitting to the switches 220 and 240 in the switching timing signal generating circuit 265 by the process as described above, a switching timing is able to separate a RF signal received from the switches 220 and 240 into a downlink signal and an uplink signal as described in the illustration of FIG. 2, adjust a short circuit according to it, and provide each path of a downlink or a uplink signal selectively.

Figure 4:
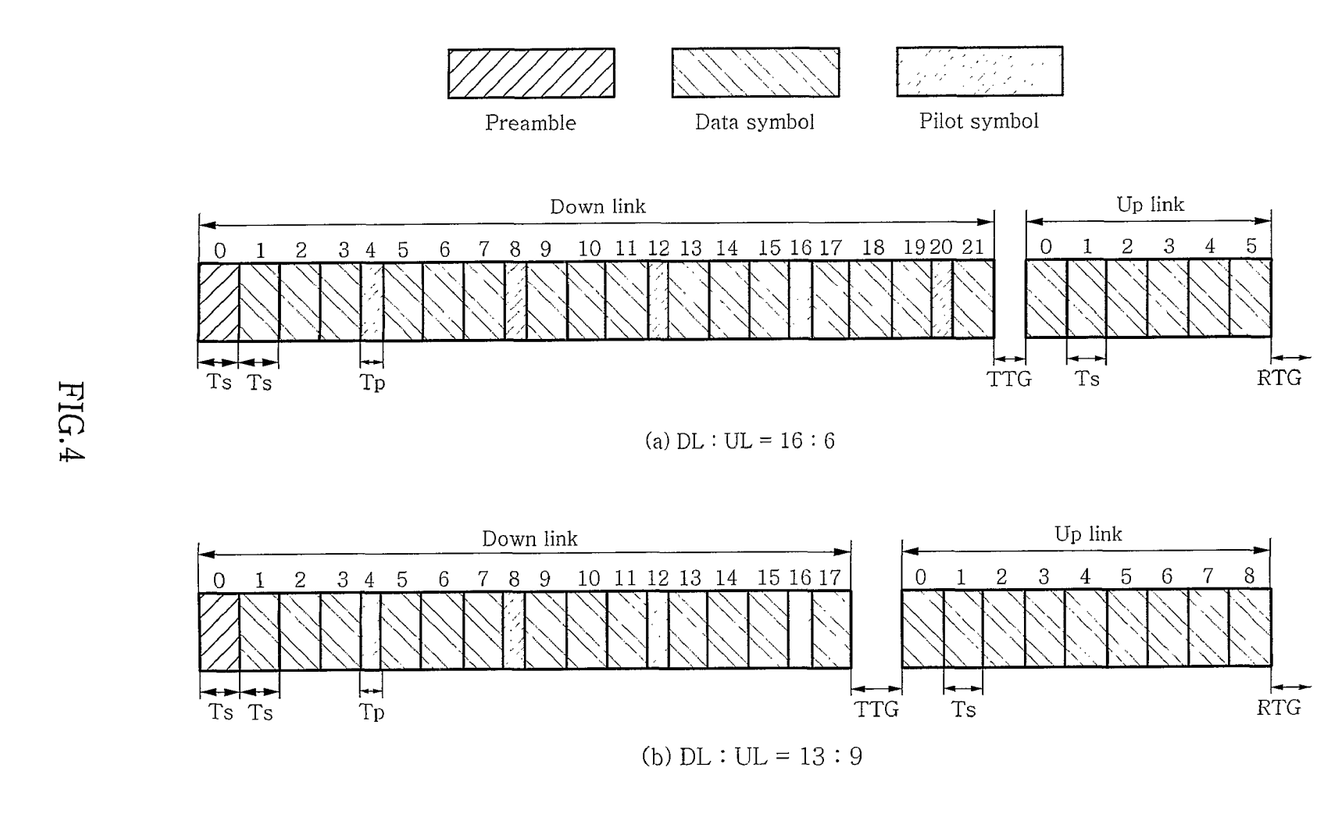
FIG. 4 is a diagram showing the frame structure of a transmitting and receiving signal by using a TOD scheme and an OFDM modulation scheme.

FIG. 4 is a diagram showing the frame structure of a transmitting and receiving signal by using a TDD scheme and an OFDM modulation scheme.

When using the TDD scheme and the OFDM modulation scheme described below, a frame structure of a transmission signal will be described focusing on an HPi system.

A single frame at an HPi system has a length of 5 mesc and is comprised of a down link frame, an up link frame, a Tx/Rx Transition Gap (hereinafter, referred to as "TTG"), a Rx/Tx Transition Gap ((hereinafter, referred to as "RTG"), etc.

Herein, the down link frame is a frame for a downlink signal transmitted to the AT 100 through the RF repeater 200 from the AP 110, and the up link frame is a frame for an uplink signal transmitted to the AP 110 through the RF repeater 200 from the AT 100. The TTG and the RTG is a Guard Time for separating a transmitting time of uplink and downlink, and during this interval, it is not allowed to transmit effective signals including data at the AP 110 and the AT 100. The TTG is defined as an interval between the down link frame and the up link frame transmitted following it, and during this interval, the AP 110 is changed into a mode for receiving an uplink signal, while the AT 100 is changed into a mode for transmitting an uplink signal. The RTG is called an interval between the up link frame and the down link frame transmitted following it, and during this interval, the AP 110 is changed into a mode for transmitting a downlink signal, while the AT 100 is changed into a mode for transmitting a downlink signal.

The down link frame and the up link frame which constructs a frame at an HPi system are composed of a plurality of OFDM symbols. Further, the OFDM symbols are comprised of a data symbol, a pilot symbol, and a preamble. Herein, the data symbol is called a time interval for transmission data, and has a whole time interval which put a time interval (CP time interval) as much as the last Tg from among an effective symbol time interval (Tb) in front of an effective symbol time interval as for the time interval of the data symbol. The reason to set the time interval of data symbol the sum of a CP time interval and an effective symbol time interval is for collecting a signal of multipath by using the OFDM scheme and maintaining quadrature among sub-carriers.

Herein, the preamble has the Ts as for a time interval like the data symbol which is a signal used to synchronize a transmitting timing by signifying a point of time to start transmission of data. The pilot symbol has $Tp(=Tb/2+Tg)$ as for a time interval, and may used to presume whether a communication channel is a down link or an up link by being inserted in the middle of the data symbol.

The ratio of the data symbol comprising a down link frame and an up link frame is capable of supporting the two structures including 16:6 and 13:9, which has been shown in FIG. 4. Of FIG. 4, (a) shows a frame structure when the ratio of the data symbol of a down link frame and an up link frame is 16:6, and (b) shows a frame structure when the ratio of the data symbol of a down link frame and an up link frame is 13:9.

In case of the down link frame, the first OFDM symbol of the down link frame is a preamble and a pilot symbol is inserted in every three data symbols, and the up link frame is comprised of the data symbols. Further, the up link frame is comprised of only data symbols. As described above, a time interval between the down link frame and the up link frame is comprised of TTG and RTG for separating an up/downlink transmitting time. The TTG and RTG have integer times of cycle corresponding to a Sampling Frequency (Fs).

Table 1 shows an individual symbol location of the down link frame and up link frame described in FIG. 4.

TABLE 1

| | Number of data symbols | DL:UL = 16:6 | DL:UL = 13:9 |
|---|---|---|---|
| L | Preamble | 0 | 0 |
| | Pilot symbol | 4, 8, 12, 16, 20 | 4, 8, 12, 16 |
| | Data symbol | (1), (2, 3, 5), (6, 7, 9), (10, 11, 13), (14, 15, 17), (18, 19, 21) | (1), (2, 3, 5), (6, 7, 9), (10, 11, 13), (14, 15, 17) |
| L | Data symbol | (0, 1, 2), (3, 4, 5) | (0, 1, 2), (3, 4, 5), (6, 7, 8) |

The number of table 1 corresponds to a symbol number designated in each symbols among frames illustrated in FIG. 4. Further, the resource allocation of time dimension for transmitting data is composed of by the unit of symbols in parenthesis.

Table 2 shows physical coefficients to the frame structure illustrated in FIG. 4.

TABLE 2

| | | DL:UL = 16:6 | | | DL:UL = 13:9 | | |
|---|---|---|---|---|---|---|---|
| | Number of data symbols | Amount | Length (sample times) | Duration (µs) | Amount | Length (sample times) | Duration (µs) |
| L | Preamble | 1 | 2,176 | 190.5 | 1 | 2,176 | 190.5 |
| | Pilot symbol | 5 | 5,760 | 504.4 | 4 | 4,608 | 403.5 |
| | Data symbol | 16 | 34,816 | 3,048.7 | 13 | 28,288 | 2,477.1 |
| L | Data symbol | 6 | 13,056 | 1,143.3 | 9 | 19,584 | 1,714.9 |
| | TTG + RTG | 1 (each) | 1,292 | 113.1 | 1 (each) | 2,444 | 214.0 |
| | Total Duration | | | 5000 | | | 5000 |

The frame is illustrated in FIG. 4 has the physical coefficients like table 2, each frame has the length of 5 msec described above, when adding up symbols of the up link frame and the down link frame, and time intervals of the TTG and the RTG.

Meanwhile, the up link frame and the down link frame in the frame are capable of having the asymmetrical structure as described above. At the down link frame, while it is used a preamble which notifies a point of time to start transmitting data and a pilot symbol which determines a channel, it is possible to use the only preamble without using the pilot symbol. Further, the signal may or may not exist according to the condition of communication channel in the data symbol of the up link and the down link The switching timing signal generating circuit 265 generates a switching timing signal by determining start position of a down link frame and an up link frame after receiving a signal to have the frame structure as described above.

Figure 5:
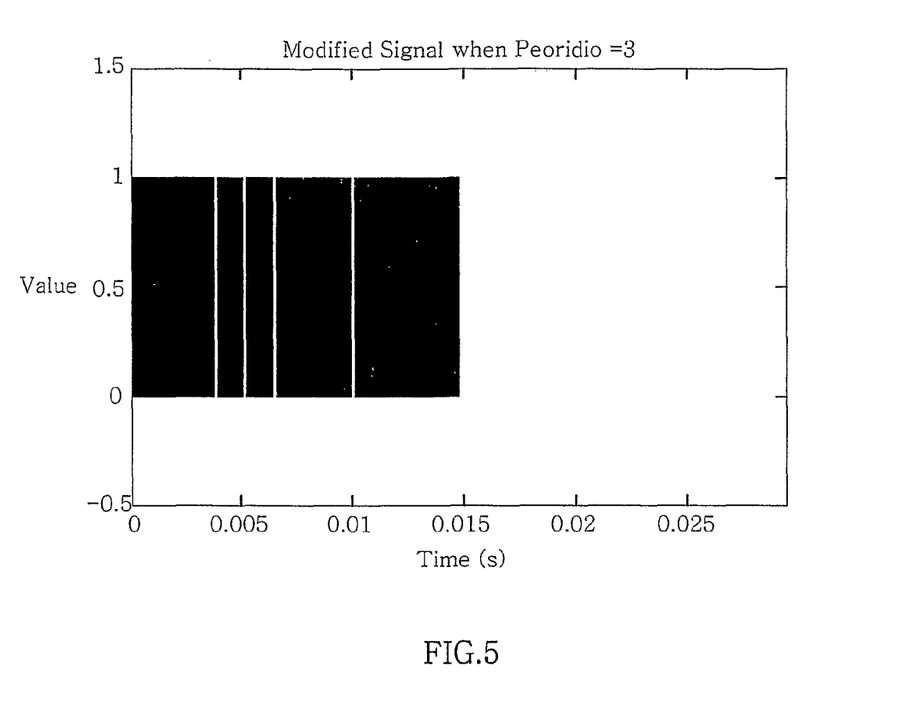
FIG. 5 is an example screen showing a waveform of a signal when a 10% probability of data existing in a data symbol of FIG. 4.
Figure 6:
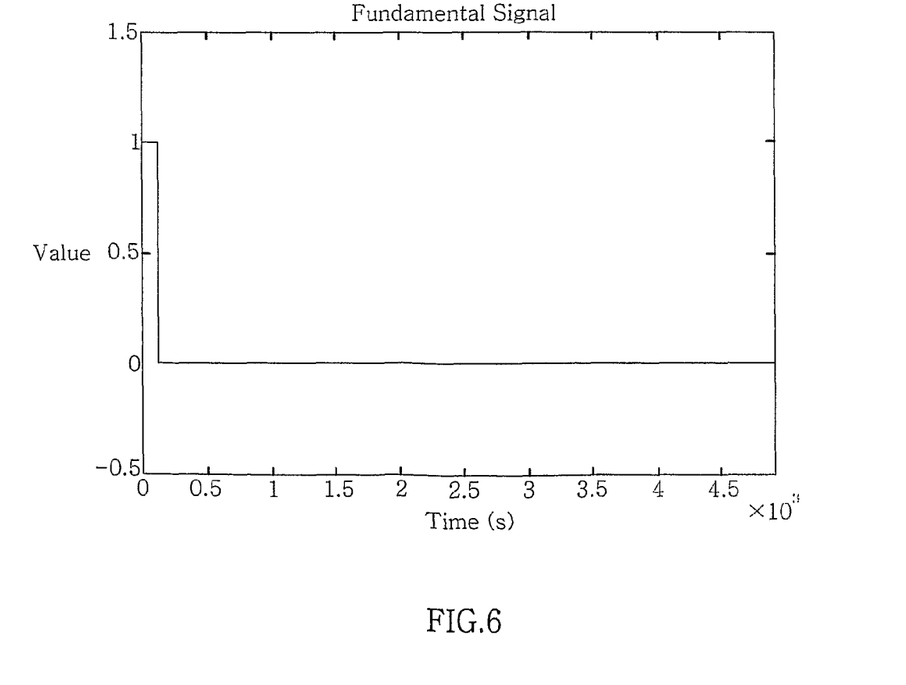
FIG. 6 is an example screen showing a waveform of reference signal using for correlation in a RF repeater.
Figure 7:
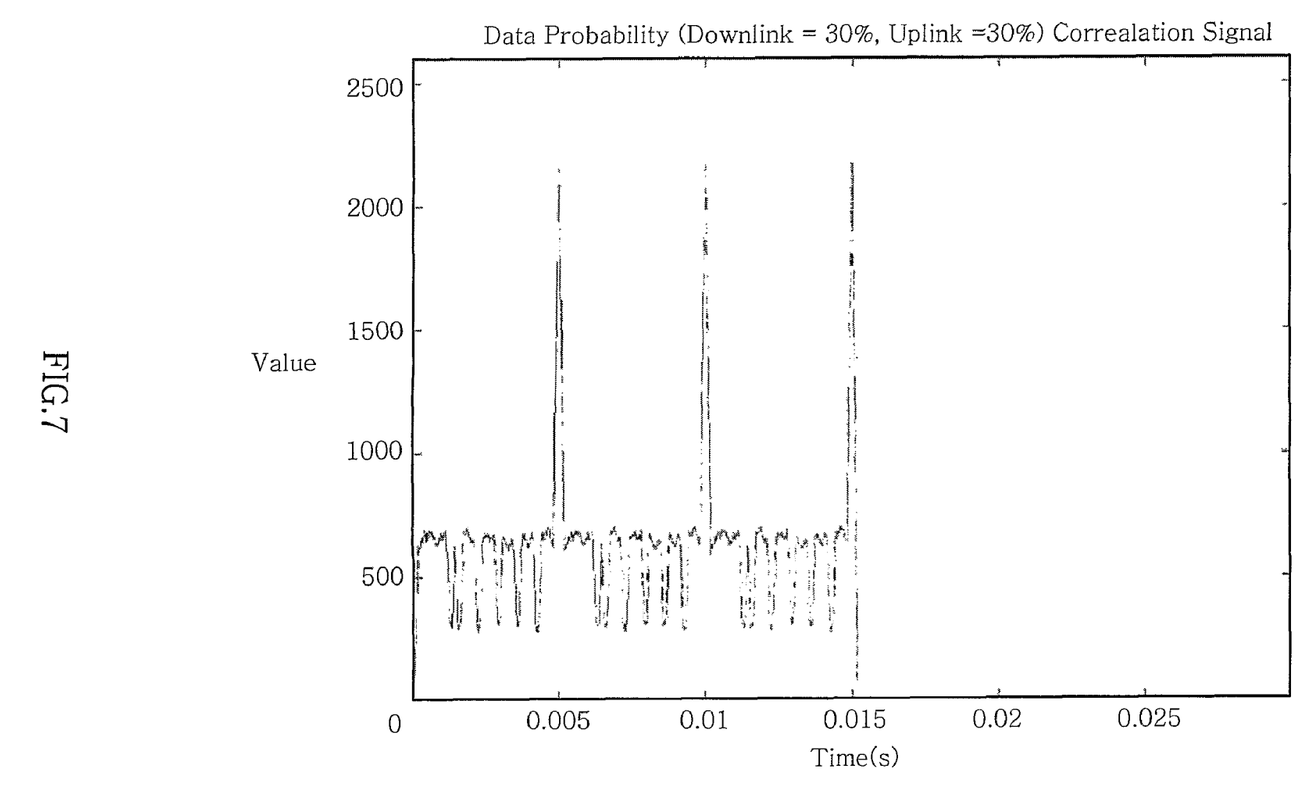
FIG. 7 is an example screen showing a waveform of a signal output in result of correlating the signal illustrated in FIG. 5 and FIG. 6.

FIG. 5 is an example screen showing a waveform of a signal when a 10% probability of data existing in a data symbol of FIG. 4. Further, FIG. 6 is an example screen showing a waveform of reference signal using for correlation in a RF repeater. Furthermore, FIG. 7 is an example screen showing a waveform of a signal output in result of correlating the signal illustrated in FIG. 5 and FIG. 6.

The coupler 215 of the RF 200 extracts a part of signals and transmits it to a switching timing signal generating circuit 265 when the signal illustrated in FIG. 5 has been transmitted to the RF repeater 200 from the AP 110. A switching timing signal generating circuit generates a standard signal illustrated in FIG. 6. The signal waveform illustrated in FIG. 7 is to come by when correlating the standard signal and the received signal illustrated in FIG. 5.

Herein, the reference signal illustrated in FIG. 6 has '1', the signal value from 0 second to 0.015 second to perform correlation in the signal interval in which the received signal exists because the received signal illustrated in FIG. 5 has a signal section from 0 second to 0.015 second Meanwhile, it is possible to know a frame starting point by identifying the location of a preamble because one of frames is started from a preamble as illustrated in FIG. 4.

A preamble signal composed of '1', simple formation, consecutively because a preamble is not a data symbol, but a signal used in order to synchronize transmitting timing by signifying a starting time point of data symbol. That is, a reference signal in a preamble signal section is equal to a signal value and therefore, the result value becomes the maximum value at a point of time where a preamble locates and this location becomes a start position of each frame when correlating the received signal illustrated in FIG. 5 and the reference signal illustrated in FIG. 6. As a result, the location of the maximum value in the signal waveform illustrated in FIG. 7 becomes a start position of a frame.

As described in FIG. 4, it is possible to calculate a starting point of a down link frame and up link frame by calculating a time interval set in each symbol of a frame when knowing a start position of a frame because a frame structure including a up link frame and down link frame has been defined in advance. That is, a start position of a frame becomes a starting point of a down link frame because a frame has started from a down link section. Further, a location to add a TTG to a time interval of a down link frame becomes a starting point of an up link frame. Therefore, 0.005 second, 0.01 second and 0.015 second having a maximum value in the waveform of FIG. 7 becomes a starting point of each frame respectively. Further, a starting point of an up link frame and a down link frame calculated on the basis of this becomes starting points of an uplink signal and a downlink signal.

The switching timing signal generating circuit 265 controls a switch by generating switching timing signals on the basis of starting points of a downlink signal and an uplink signal. As a result, it is possible to distinguish between a downlink signal and an uplink signal, and provide a transmission path for each signal in the RF repeater 200.

Meanwhile, it is possible to generate a switching timing signal by distinguishing between a downlink signal and an uplink signal even when using the only preamble without changing a ratio of a data symbol which makes up an up link frame and a down link frame and using a pilot symbol because one frame has started from a preamble, a result value of correlation has become the maximum at a time interval where a preamble has been located, and then it is possible to know a start position of a frame as described above.

Figure 8:
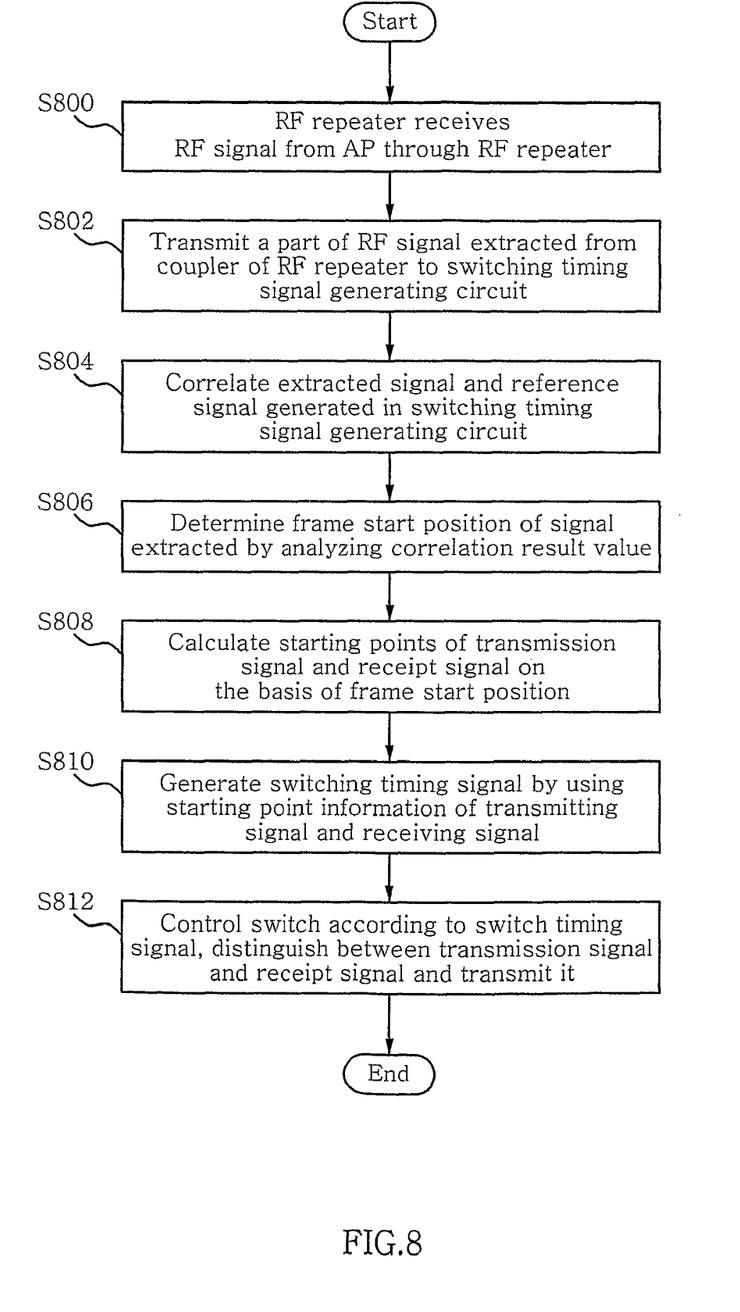
FIG. 8 is a flow diagram illustrating a switching timing signal generating process dividing transmitting and receiving signals in a RF repeater of a mobile communication network using a TDD scheme and an OFDM modulation scheme according to a preferred embodiment of the present invention.

FIG. 8 is a flow diagram illustrating a switching timing signal generating process separating transmitting and receiving signals in a RF repeater of a mobile communication network using a TDD scheme and an OFDM modulation scheme according to a preferred embodiment of the present invention.

AS illustrated in FIG. 8, the RF repeater 200 receives a RF signal transmitted from the AP 110 through the donor antenna 205 (S800). The BPF 210 of the RF repeater passes through the only signal of transmission frequency band in RF signals transmitted, and transmits to the switch 220 after eliminating a signal component of another frequency band. That is, the coupler 215 located in between the BPF 210 of the RF repeater 200 and the switch 220 extracts a part of a RF signal, and transmits it to the switching timing signal generating circuit 265. The switching timing signal generating circuit 265 correlates the signal transmitted from the coupler 215 and the reference signal generated in the reference pulse generated of the switching timing signal generating circuit 265 (S804). As a result of the correlation, since the location showing the maximum value at the waveform becomes a start location of a frame, it is allowed to determine a start position or a frame by analyzing the waveform by using the result of the correlation (S806).

Since the frame structure of the signal using the TOO scheme and the OFDM modulation scheme is defined in advance as described in FIG. 4, the switching timing signal generating circuit 265 calculates a starting point of a downlink signal and uplink signal included in the RF signal on the basis of a frame starting point (S808). When the starting points of the downlink signal and uplink signal are calculated, by using this, the switching timing signal generating circuit 265 generates a switching timing signal for distinguishing the downlink signal from the uplink signal, and transmits it to the switches 220 and 240 (S810). When the switching timing signal is transmitted to the switches 220, 240, the switches 220 and 240 distinguishes the downlink signal from the uplink signal by using the switching timing signal, controls the opening and closing of the switches 220 and 240, and then provides path for each signal selectively (S812). Therefore, the RF repeater 200 prevents the switching timing signal from interfering with the downlink signal and uplink signal. Further, the RF repeater 200 repeats the transmission signal between the AP 110 and the AT 100 by transmitting it to the AT 100 in the case of the downlink signal, and transmitting it to the AP 110 in the case of the uplink signal.

According to the present invention as described above, it is possible to operate a RF repeater maintaining stability because the RF repeater of a mobile communication network using the TDD scheme and the OFDM scheme itself distinguishes between a downlink signal and an uplink signal, generates a switching timing signal to provide a path for each signal selectively, and controls a switch.

Further, it is possible to solve the interference problem between the downlink signal and the uplink signal caused since the downlink signal and uplink signal uses the same frequency.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A method for generating a switching timing signal to separate RF signals transmitted in an RF repeater of a mobile communication system between an AP (Access Point) and an AT (Access Terminal) into downlink signal(s) and uplink signal(s) with the RF repeater operation based on a TDD scheme and an OFDM modulation scheme, the method comprising the steps of:
   (a) receiving an RF signal from the AP, extracting only a part of the RF signal from a coupler in the RF repeater, and transmitting the part of the RF signal extracted from the coupler to a switching timing signal generating circuit;
   (b) deriving a pulse waveform from the extracted RF signal by using a pulse generator;
   (c) generating a reference pulse waveform for comparison with the derived pulse waveform;
   (d) correlating the derived pulse waveform from step (b) with the reference pulse waveform from step (c) to generate a correlated comparison signal;
   (e) determining a frame start position using the correlated comparison signal wherein the frame start position is at a location where the correlation of the derived pulse waveform and the reference pulse waveform is maximized;
   (f) calculating a starting point for the downlink signal and for the uplink signal based on the frame start position;
   (g) generating a switching timing signal based on the calculated starting point of the downlink signal and the uplink signal, and transmitting the switching timing signal to switches of the RF repeater, wherein the switches of the RF repeater respond to the switching timing signal by separating the RF signal into the downlink signal and the uplink signal; and
   (h) wherein the downlink signal and the uplink signal are separately transmitted to an antenna through which the downlink and uplink signals are radiated using the switching timing signal.

2. The method as claimed in claim 1, wherein, at step (a), upon receiving the RF signal from the AP, a BPF (Band-Pass Filter) of the RF repeater transmits signals to the switches of the RF repeater after passing therethrough signal components of a frequency band used in signal transmission between the AP and the AT while eliminating a signal component of other frequency bands, and extracts a part of the RF signal that has passed through the BPF from the coupler of the RF repeater and transmits the part of the RF signal to a switching timing signal generating circuit.

3. The method as claimed in claim 2, wherein the signal components of a frequency band used in the signal transmission between the AP and the AT include the signal components of 2.3 GHz frequency band.

4. The method as claimed in claim 1, wherein, at step (h), when the downlink signal is received, the downlink signal is radiated through a remote antenna via a LNA of the RF repeater, an attenuator, and a HPA, and when the uplink signal is received, the uplink signal is radiated through a donor antenna via a LNA of the RF repeater, an attenuator 230, and a HPA, wherein the downlink signal and the uplink signal are distinguished by using the switching timing signal.

5. The method as claimed in claim 1, wherein the RF signal includes a down link frame, an up link frame, a Tx/Rx Transition Gap (hereinafter, referred to as "TTG") and a Rx/Tx Transition Gap (hereinafter, referred to as "RTG").

6. The method as claimed in claim 5, wherein, the frame has the length of 5 msec as a result of adding all time intervals of the down link frame, the up link frame, the TTG and the RTG.

7. The method as claimed in claim 5, wherein, the down link frame is a frame for a downlink signal transmitted from the AP through the RF repeater to the AT, while the up link frame is a frame for an uplink signal transmitted from the AT through the RF repeater to the AP.

8. The method as claimed in claim 7, wherein, the TTG is a Guard Time for separating a transmission time of the down link frame from a transmission time of the up link frame, and during the TGG, the AP is switched into a
   mode for receiving the up link frame while the AT is switched into a mode for transmitting the down link frame.

9. The method as claimed in claim 7, wherein, the RTG is a Guard Time for separating a transmission time of the up link frame from a transmission time of the down link frame, and during the TGG, the AP is switched into a mode for receiving the down link frame while the AT is switched into a mode for transmitting the up link frame.

10. The method as claimed in claim 8 or claim 9, wherein, during the TTG or the RTG, each of the AP and the AT does not transmit an effective signal including data.

11. The method as claimed in claim 9, wherein, during the TTG or the RTG, each of the AP and the AT is unable to transmit an effective signal including data.

12. The method as claimed in claim 5, wherein, at step (f), the frame start position is determined as the starting point of the down link frame and a location of a TTG plus a time interval of a down link frame is determined as the starting point of the up link, while the starting point of the down link frame is determined as the starting point of the downlink signal and the starting point of the up link frame is determined as the starting point of the uplink signal.

13. The method as claimed in claim 5, wherein, each of the down link frame and the up link frame is comprised of a plurality of OFDM symbols, the OFDM symbols including a data symbol, a pilot symbol and a preamble.

14. The method as claimed in claim 13, wherein, a ratio of the data symbol comprising the down link frame and the up link frame has an asymmetric structure of 16:6 or 13:9.

15. The method as claimed in claim 13, wherein, the first OFDM symbol of the down link frame is the preamble and a pilot symbol is inserted in every three data symbols, and the up link frame is comprised of the data symbols.

16. The method as claimed in claim 13, wherein, the first OFDM symbol of the down link frame is the preamble and the remaining OFDM symbol is comprised of the data symbols, and the up link frame is comprised of the data symbols.

17. The method as claimed in claim 13, wherein, the time interval of the data symbol corresponds to a time interval ($Ts=Tg+Tb$) which is the last Tg from among an effective symbol time interval (Tb) plus effective symbol time interval.

18. The method as claimed in claim 17, wherein, the preamble has the Ts as its time interval, and is used to synchronize a transmission timing by notifying a point of time to start transmission of data.

19. The method as claimed in claim 17, wherein, the pilot symbol has Tp(=Tb/2+Tg) as its time interval, and is used to determine whether a communication channel is a down link or an up link by being inserted in the middle of the data symbol.

20. A switching timing signal generating circuit for generating a switching timing signal separating RF signals received from an AP and an AT in a RF repeater into a downlink signal and an uplink signal for use in a mobile communication network employing a TDD scheme and an OFDM modulation scheme, the switching timing generating circuit comprising:

a divider for receiving extracted RF signals extracted as a part of the RF signals from a coupler included in the RF repeater;

a level director for measuring a level of the extracted RF signal received from the divider;

a Variable Gain Amplifier (hereinafter, referred to "VGA") for receiving a level value measured at the level detector, and generating the level of the extracted RF signal;

a log-scale amplifier for converting a variation of the extracted RF signals from a linear scale to a decibel (dB) scale;

a pulse generator for generating a pulse waveform signal by using the extracted RF signals received from the log-scale amplifier;

a reference pulse generator for generating a reference pulse waveform signal for use in determining a frame start position of the extracted RF signals;

a comparator for correlating the pulse waveform signal received from the pulse generator with the reference pulse waveform signal received from the reference pulse generator;

a timing controller for determining a frame start position of the extracted RF signals at a location where the correlation of the pulse waveform signal and the reference pulse waveform is maximum and, for calculating a starting point of the downlink signal and the uplink signal on the basis of the frame start position, and generating from said starting points a switching timing signal for the downlink signal and the uplink signal, and for transmitting the switching timing signal to a switch of the RF repeater; and a phase tuning circuit for receiving a phase information of the pulse waveform signal generated in the pulse generator, and tuning the phase of the reference pulse waveform signal.

21. The switching timing signal generating circuit as claimed in claim 20, wherein the timing controller has a frame structure information of the RF signals, and calculates a starting point of a downlink signal and an uplink signal included in the RF signals on the basis of the frame location by using the frame structure information.

22. A RF repeater for separating RF signals transmitted between an AP (Access Point) and an AT (Access Terminal) into a downlink signal and an uplink signal for use in a mobile communication network employing a TDD scheme and an OFDM modulation scheme, the RF repeater comprising:

a Band Pass Filter (hereinafter, referred to as "BPF") for passing signal components of a frequency band used in transmission of the RF signals transmitted between the AP and the AT, while blocking signal components of unused frequency bands;

a Low Noise Amplifier (hereinafter, referred to as "LNA") for reducing noise components of the RF signals, while amplifying signal components;

an attenuator for adjusting a signal level of an amplified signal;

a High Power Amplifier (hereinafter, referred to as "HPA") for amplifying a controlled signal received from the attenuator up to an effective power level feasible for transmitting via air;

a coupler for extracting only a part of the RF signal;

a switching timing signal generating circuit for generating a switching timing signal from starting point information for the downlink signal and uplink signal respectively comprising a pulse shape generator for deriving a pulse waveform signal from the RF signal extracted from the coupler, a reference pulse generator for generating a reference pulse waveform, a comparator for making a correlated comparison between the pulse waveform signal derived from the RF signal and the reference pulse waveform, a timing controller for determining a frame start position for the extracted RF signal based on the correlated comparison and for calculating a starting point for the downlink signal and for the uplink signal based on the frame start position; and a pair of switches responsive to the switching timing signal from the switching timing signal generating circuit for separating the RF signals into the downlink signal and the uplink signal.

23. The RF repeater as claimed in claim 22, wherein the coupler is located in between the BPF and each switch, for transmitting the extracted RF signal to the switching timing signal generating circuit.

24. The RF repeater as claimed in claim 22, further comprising a donor antenna for receiving the RF signals transmitted from the AP and a remote antenna for receiving the RF signals transmitted from the AT.

25. The RF repeater as claimed in claim 24, wherein, when the RF signals are a downlink signal, the RF signals are transmitted through the LNA 225, the attenuator 230 and the HPA 235 to the remote antenna.

26. The RF repeater as claimed in claim 24, wherein, when the RF signals are an uplink signal, the RF signals are transmitted through the LNA 250, the attenuator 255 and the HPA 260 to the donor antenna.

* * * * *